(12) United States Patent
Akenine-Moller et al.

(10) Patent No.: US 9,569,886 B2
(45) Date of Patent: Feb. 14, 2017

(54) VARIABLE SHADING

(71) Applicant: Intel Corporation, Santa Clara, CA (US)

(72) Inventors: Tomas G. Akenine-Moller, Lund (SE); Karthik Vaidyanathan, Berkeley, CA (US); Marco Salvi, San Francisco, CA (US); Robert M. Toth, Lund (SE); Aaron Lefohn, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/133,757

(22) Filed: Dec. 19, 2013

(65) Prior Publication Data

US 2015/0178983 A1 Jun. 25, 2015

(51) Int. Cl.
*G06T 15/00* (2011.01)
*G06T 15/80* (2011.01)

(52) U.S. Cl.
CPC ............. *G06T 15/80* (2013.01); *G06T 15/005* (2013.01); *G06T 2210/52* (2013.01)

(58) Field of Classification Search
CPC ............... G06T 15/503; G06T 2210/52; G06T 2200/28; G06T 15/80; G06T 15/005; A01B 12/006
USPC .................................. 345/426, 419, 611, 422
See application file for complete search history.

(56) References Cited

U.S. PATENT DOCUMENTS

| | | | | |
|---|---|---|---|---|
| 7,170,515 B1* | 1/2007 | Zhu | ............................... | 345/422 |
| 7,538,779 B2* | 5/2009 | Hastings | ...................... | 345/611 |
| 7,548,238 B2* | 6/2009 | Berteig et al. | ................ | 345/426 |
| 7,554,538 B2* | 6/2009 | Wexler et al. | ................ | 345/418 |
| 8,605,087 B2* | 12/2013 | Everitt et al. | ................. | 345/426 |

OTHER PUBLICATIONS

Fatahalian, K., Boulos, S., Hegarty, J., Akeley, K., Mark, W. R., Moreton, H., and Hanrahan, P. 2010. Reducing Shading on GPUs using Quad-Fragment Merging. ACM Transactions on Graphics, 29, 67:1-67:8.*
Barringer et al, A4: asynchronous adaptive anti-aliasing using shared memory, ACM Transactions on Graphics (TOG)—SIGGRAPH 2013 Conference Proceedings TOG Homepage vol. 32 Issue 4, Jul. 2013, pp. 1-10.*
Gribel et al,High-quality spatio-temporal rendering using semi-analytical visibility, SIGGRAPH '11 ACM SIGGRAPH 2011 papers Article No. 54, pp. 1-12.*
U.S. Appl. No. 14/103,951, filed Dec. 12, 2013 entitled "Decoupled Shading Pipeline."
U.S. Appl. No. 13/922,404, filed Jun. 20, 2013 entitled "Subset Based Compression and Decompression of Graphics Data."

\* cited by examiner

*Primary Examiner* — Phu K Nguyen
(74) *Attorney, Agent, or Firm* — Trop Pruner & Hu, P.C.

(57) ABSTRACT

In some embodiments, a given frame or picture may have different shading rates. In one embodiment in some areas of the frame or picture the shading rate may be less than once per pixel and in other places it may be once per pixel. An algorithm may be used to determine how the shading rate changes across the frame.

37 Claims, 9 Drawing Sheets

VARIABLE SHADING

BACKGROUND

This relates generally to graphics processing.

Graphics processors are used to develop images for display on computer displays. A graphics pipeline includes a plurality of stages that develop the finished depiction. An image is rendered using rasterization by sampling different functions and shading. A visibility function determines whether a sample point is inside a triangle. Shading determines what is the color at a certain sample point. Thus, the terms "visibility samples" or "shading samples" are used hereinafter.

In super-sampling anti-aliasing (SSAA), visibility samples are the same as the shading samples. In multi-sampling anti-aliasing (MSAA), there is a single shading sample per pixel and many visibility samples per pixel. Graphics processors generally support these two anti-aliasing solutions.

BRIEF DESCRIPTION OF THE DRAWINGS

Some embodiments are described with respect to the following figures.

DETAILED DESCRIPTION

In some embodiments, a given frame or picture may have different shading rates. In one embodiment in some areas of the frame or picture the shading rate may be less than once per pixel and in other places it may be once per pixel and, yet in other places, it may be more than once per pixel. Examples where the shading rate may be reduced include areas where there is motion and camera defocus, areas of peripheral blur, and in general, any case where the visibility is reduced anyway.

The concept of MSAA is generalized in one of a variety of different ways. In general, this may be called variable shading rate. One way it can be generalized is to compute the shading at a rate lower than once a pixel, for example, once every 1×2 pixels, 2×1 pixels, 2×2 pixels, 4×2 pixels, 2×4 pixels, or 4×4 pixels, to mention some examples. It is also feasible to have a fully continuous distribution with two floating point numbers, A and B, by giving one shading sample per A×B pixels. Another variant is to split the shading into two parts so that one part is done per pixel or per sample and the other part is done at a slower rate and then the results are combined.

In modern real-time graphics pipelines, pixel/fragment shading is performed at a rate of once per geometric primitive per pixel (if visible). However, there are many opportunities for reducing pixel shading rates. Such reductions can result in power consumption savings and in other performance benefits. For example, in cases where motion blur and camera defocus exists, there is an opportunity to have different shading rates in different parts of a frame. When a scene is rendered with motion and camera defocus, regions of the screen may appear blurred, so the pixel shading rate can be lower in those regions since they mostly display low frequency content. In cases of peripheral blur, shading rates can be lowered at the periphery of the screen where high frequency details are harder to perceive by the user, at least assuming the user is focusing attention at the center of the screen. Also, in higher density displays, the shading rate can be lowered without significant loss of detail.

While the shading rate can be flexibly lowered, visibility is also sampled at the full rate to preserve sharp features like edges, in some embodiments.

Figure 1:
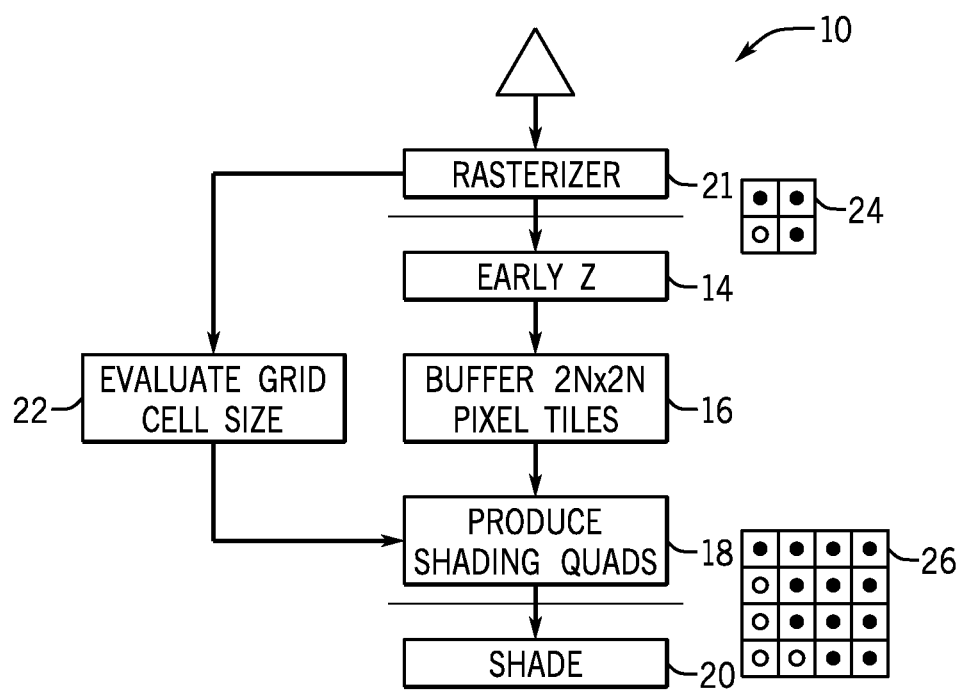
FIG. 1 is a flow chart for one embodiment.

Referring to FIG. 1, a sequence 10 may be implemented in software, firmware and/or hardware. In software and firmware embodiments, it may be implemented by computer executed instructions stored in one or more non-transitory computer readable media, such as magnetic, optical, or semiconductor storages.

Initially, the rasterizer 21 tests primitives against pixel regions of a given size, in this example, 2×2 pixel regions 24, called quads. (Pixel regions of other sizes can also be used). The rasterizer traverses the quads in a space filling order, such as the Morton order. If the primitive covers any of the pixels or samples, in the case of multi-sampling, in the quad, as indicated in the depiction labeled covered quad, the rasterizer sends the quad downstream to a small tile buffer 16. Early z-culling may be done at 14 in some embodiments.

For a given primitive, the tile buffer may divide the screen into 2N×2N pixel sized tiles, called shading quads, and may store all rasterized quads that fall inside a single tile as indicated in block 18. A screen aligned shading grid may be evaluated for each 2N×2N tile (block 22).

The size of the grid cell or shading quad may be limited to powers of two, as measured in pixels, in some embodiments. For example, the cell sizes may be 1×1, 1×2, 2×1, 4×1, 4×2, 4×4, up to N×N, including 1×N and N×1 and all intermediate configurations.

By controlling the size of the shading grid cell, one can control the shading rate at block 20. That is, the bigger the cell size, the lower the shading rate for a tile.

The quads that are stored in the tile buffer are then grouped into shading quads 26 that consist of groups of adjacent grid cells, such as 2×2, adjacent grid cells in one embodiment (block 18). The shading quads are then shaded and the outputs from the shader are written back to all covered pixels in the color buffer.

The grid size is evaluated per 2N×2N pixel tile (where N is the size of largest decoupled pixel within a resized quad and separately for each geometric primitive. The "largest decoupled pixel" refers to the size of the pixel when the size of shading quad is changed. In one embodiment four pixels form a quad and each pixel forms one quarter of the quad size.

The grid size can be controlled by an attribute called the scale factor that includes a pair of signed values—the scale factor along the X axis, $S_x$, and the scale factor along the Y axis, $S_y$. The scale factor can be assigned in various ways. For example, it can be interpolated from vertex attributes or computed from the screen position.

Using signed scale factors can be useful, for example, in the case of camera defocus, if a primitive crosses the focus plane. In this case, the vertices of a primitive can be out of focus while the interior of the primitive may be in focus. Then one can assign negative scale factors as attributes for vertices that are in front of the focal plane and positive scale factors as attributes for vertices behind the focal plane and vice versa. For the regions of the primitive that are in focus, the scale factor interpolates to zero and, therefore, maintains high shading rates in the in-focus regions.

The scale factors can vary inside a tile, while a single quantized grid cell size is still computed for each tile. This may produce discontinuities in the grid sizes moving from tile-to-tile and can result in visible grid transitions.

Figure 2:
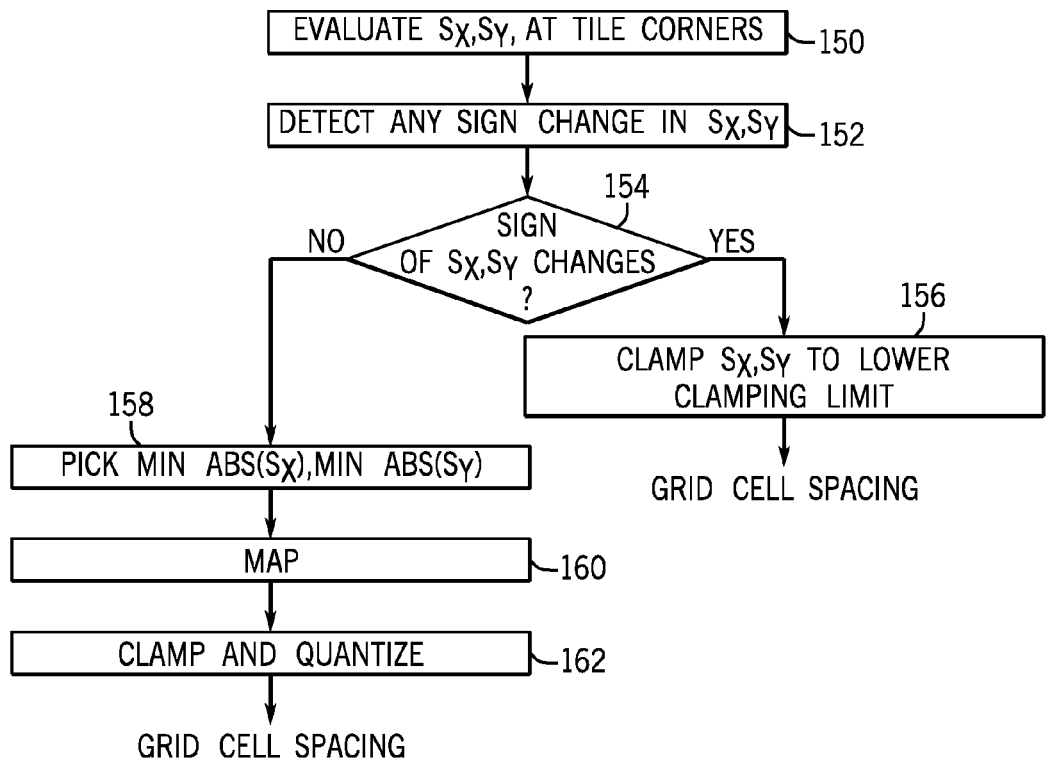
FIG. 2 is a flow chart for another embodiment.

FIG. 2 is a flow chart for a sequence according to one embodiment. The sequence may be implemented in software, firmware and/or hardware. In software and firmware embodiments, it may be implemented by computed executed instructions stored in one or more non-transitory computer readable media, such as magnetic, optical, or semiconductor storages.

In order to compute the grid size from the scale factor, the scale factor is first interpolated at the four corners of a 2N×2N tile (block 150). If there is a sign change across the four corners of the grid cell (blocks 152 and 154), this indicates a minimum value inside the tile. In this case, the minimum possible grid cell spacing is selected, which may typically be one pixel. Then $S_x$ and $S_y$ are clamped to a lower clamping limit (block 156). If there is no sign change, the minimum absolute value of the scale factor is selected from the four corners (block 158). For some implementations, operations other than the minimum may be used, for instance the average of the absolute values. The quad size then undergoes an affine mapping (block 160), followed by clamping and quantization (block 162), to determine the grid cell size.

Figure 3:
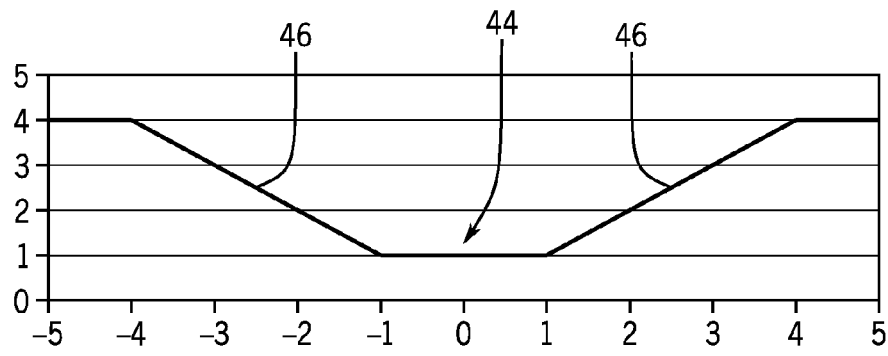
FIG. 3 is a graph of grid cell size with respect to X and Y scale factors.

The X and Y scale factors are defined over the real line and independently mapped to X and Y grid cell size by a function, as shown in FIG. 3, referred to as a scale function, with sides 46 and bottom 44. Other functions may be used in other embodiments. Grid cells smaller than a single screen space pixel may not be supported, in some embodiments, and, in these cases, the grid cell size is never smaller than one.

The scale function maps the scale factors that are useful in determining how the quad size changes and therefore how the shading sampling rate changes. Specifically, the scale function maps the scale factors to a discrete pixel size. The scale factors are used to determine the quad's actual physical screen size. As used herein, a scale function is any function that reduces then increases a pixel region (such as a shading quad) size in order to change the shading rates.

A value comes from the graphics pipeline as an input to the rasterizer which is used to set the scale factor. For example, the input may come from a vertex shader, fixed function hardware or it may be implemented at an application program interface level. It may also come from fixed function hardware. The input tells the system, for some point on the screen, or for some primitive, what should be the value for the quad size. Thus, in FIG. 3, the input value tells what the scale factor would be relative to the flat bottom portion of the scale function. It maps the size of the quad into a physical screen size.

In some embodiments, the mapping may be to a physical screen size in terms of powers of two. The use of powers of two simplifies the hardware implementation.

Advantageously at the transition point, the scale factor is relatively small and on either side of the transition point, indicated by the bottom of the scale, the scale factor is larger. Thus as an example, when an object is in focus at zero on the x axis, it may be out of focus at greater and lesser depths. Thus in one embodiment at depths less than the plane in which the object is in focus the scale factor may be considered negative, and at depths greater than that zero depth level, the scale factor may be positive.

One use case for the scale function may involve an attribute computed per vertex. A triangle may be subject to defocus, with the region in focus at one depth, indicated at zero in the scale function on the x axis, and the region may be out of focus at lesser and greater depths. The more blurry the triangle is, the less often it may be shaded and hence the scale function provides a tool for making this transition. The scale function provides a way to linearly interpolate and also to go from negative on one side of the focus plane to zero at focus and to a positive number on the other side. Thus, with the scale function, the pixel size is larger on one side of the focus plane, and then it gets smaller at the focus plane, and then it gets larger on the other side of the focus plane.

The x axis of the scale function indicates any property interpolated across individual triangles in one embodiment. In the example described above, the x axis is a measure of depth. But it could be any other property such as the distance across the screen in an example with peripheral blurring. The scale function is one way to change the quad size but there are other functions and other inputs that can be used to implement the scale factors in other embodiments.

In another embodiment, the scale function might not indicate an interpolated property. For example, in the case of peripheral blur, it may be a value based on the screen coordinates that can be computed by a fixed function hardware.

To provide more flexibility, the affine mapping and clamping function may be governed by two parameters:

float2 ShaderPixelSize=1+max(0,(abs(ScaleFactor)−A)*B);

where A controls the width of the flat region 44, while B controls the slope of the left and right ramps 46.

The X and Y components of the grid cell size may be clamped to a finite interval [1,M], where M is a power of two between [1,N].

In order to not allow shading quads to overlap regions of the screen that map to different shading processors, the size of the grid cell determined by the scale function may be quantized to produce physical sizes in powers of two (i.e. 1, 2, 4, etc.) in some embodiments. This avoids reshading the same quad multiple times. This choice also minimizes the amount of information exchanged between shading processors. There are at least two methods for quantizing the grid cell size to a power of two: round and floor. An example pseudo-code for the case where N=4 is as follows:

```
//Default Quantized SP Size
QuantizedCellSize=1;
switch (QuantizationMode) {
caseRound:
    if (ScaleFactor >= 3.f) QuantizedCellSize = 4.f;
    else if (ScaleFactor > 1.5f) QuantizedCellSize = 2.f;
    break;
caseFloor:
    if (ScaleFactor >= 4.f) QuantizedCellSize = 4.f;
    else if (ScaleFactor >= 2.f) QuantizedCellSize = 2.f;
    break;
default:
    break;
}
```

The input value such as an input from the vertex shader, an input from the user, an input from an API, or any input from further up the graphics pipeline, may be used to determine the adjusted quad size. In one embodiment, the input value may change smoothly and yet the quad size may not adjust in a similarly smooth fashion. This is because of the effects of quantization to factors of two. In some embodiments, these discontinuities that result from the difference between what the input value dictates should be the quad size and the actual quad size, as quantized, may become visible on the screen.

In some embodiments this screen effect may be compensated for by modifying the texture level of detail (LOD) to compensate for the error produced by the quantization. More specifically, by blurring the textures by an amount that corresponds to the amount by which the input value suggested quad size differs from the actual quad size, these discontinuities can be made relatively hard to see. Thus in some embodiments, an adjustment of the texture coordinates may be made according to the ratio of the desired size that was specified by the input value from upstream to the actual resulting quantized size.

The scale factors can vary smoothly inside a tile. However, a quantized grid cell size may be evaluated once for each tile. This may produce discontinuities in the grid size moving from tile to tile. To compensate these discontinuities, the texture sample or level of detail calculation may be enhanced to reflect the actual, un-quantized sampling rate. This may be done by scaling the finite differences that are used to compute the level of detail for a given set of texture coordinates:

$$\text{Finite\_Difference\_new} = \text{Finite\_Different\_Old} * (\text{Desired\_Cell\_Size}/\text{Quantized\_Cell\_Size})$$

The un-quantized desired cell size may be evaluated at a fine granularity, such as 2×2 pixel regions, and a compensation may be applied at this fine granularity. This may create a smooth variation in image detail, masking the discontinuities in grid size.

While a two dimensional example is given, three dimensional implementations are also contemplated. In one embodiment, three dimensional spaces may be flattened to two dimensional shading spaces. Three and higher dimensional spaces with decoupling of the visibility space from the shading space are also contemplated.

Figure 4:
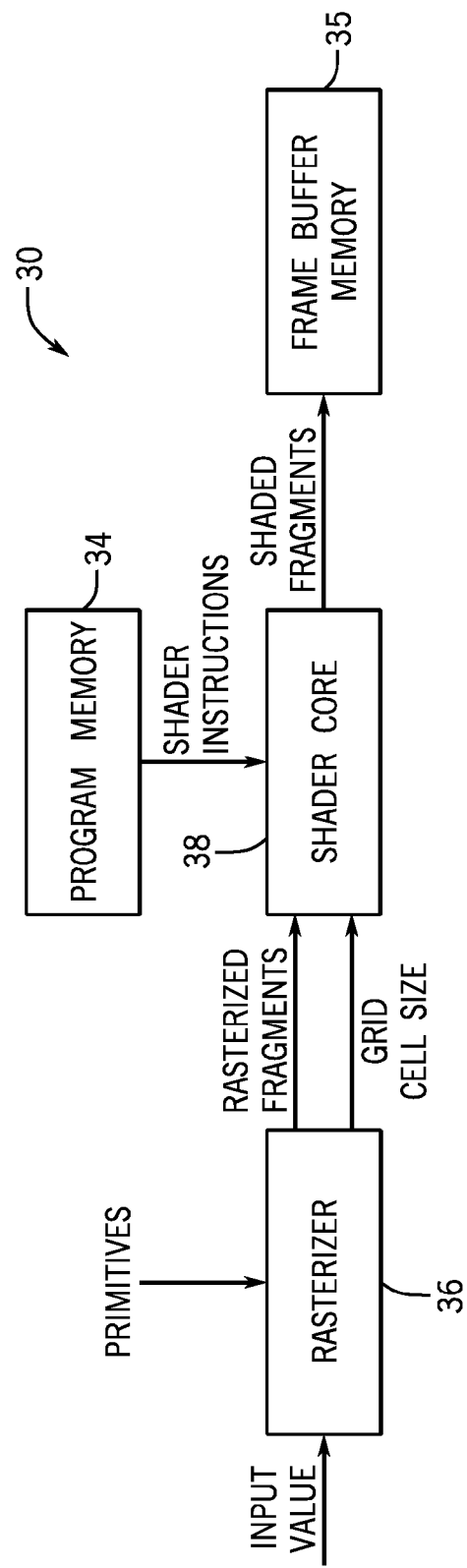
FIG. 4 is a depiction of a graphics pipeline according to one embodiment.

Referring to FIG. 4, when a program running on a host processor initiates a draw call, the graphics pipeline processes the draw call. One primitive is rasterized at a time. The rasterizer 36 generates fragments and also generates in one embodiment, a grid cell size. The grid cell size is used in the shader core 38. A program memory 34 stores the instructions for the shader core 38. The shader core outputs the shaded fragments to a frame buffer memory 35.

There are a variety of applications for variable shading rate. In accordance with one embodiment, a fixed-rate fall-off may be exploited. A fixed lookup table may be built with a fall-off from the center of the screen to the edges of the screen. Then a look-up table may have one shading sample per pixel (SSPP) in the center, and then fall-off as smoothly as the graphics processor allows.

Two examples of the fall-off function from the center towards the edges is (1) from 1×1 to 1.5×1.5 to 2×2 to 2.5×2.5 to 3.0×3.0 to 3.5×3.5 to 4.0×4.0 or (2) from 1×1 to 2×2 to 4×4.

The fall-off distribution may be circular in one embodiment but it may also be rectangular to simplify the hardware implementation. Other shapes may also be used.

Any location on the screen or even off the screen can be used as a center to compute the lookup table index. Then the fall-off function can be translated across the screen without having to support multiple lookup tables.

With such a fixed rate, one can still let the application program interface (API) supply some constants to change the shading rate. Assuming that the fixed function shading rate is R, the user can give two constants, s and b, where s is a scale and b is the bias. Then the new shading rate becomes R'=s*R+b. In some applications, including mobile devices and tablets, this option provides for a simpler implementation. In some implementations, the center may be the center of the screen, while in others it may be set by the programmer an API call.

Figure 5:
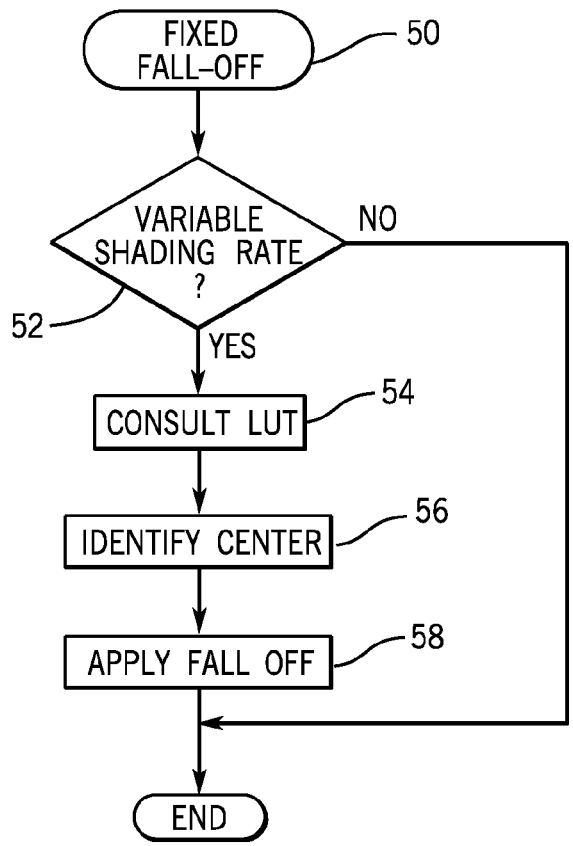
FIG. 5 is a flow chart for one embodiment.

Referring to FIG. 5, a fixed fall-off sequence 50 may be implemented in software, firmware and/or hardware. In software and firmware embodiments it may be implemented by computer executed instructions stored in one or more non-transitory computer readable media such as magnetic, optical or semiconductor storages. For example it may be implemented in one embodiment in the shader core 38 shown in FIG. 4.

Sequence 50 begins by determining if variable shading rate is opted for as determined in diamond 52. If so, the appropriate lookup table is consulted as indicated in block 54 in order to obtain the shading rate. Next the center of the depiction is identified as indicated in block 56. This may be supplied in a known predetermined location, from the user or via default as the center of the depiction, to mention a few examples. Then the appropriate fall-off routine is applied as indicated in block 58.

In accordance with another embodiment, a programmable shading rate may be used. In this case, the programmer handles the shading rate. The shading rate may be computed per vertex, interpolated over the triangle and truncated or rounded off to the most appropriate shading rate that the graphics processor supports.

In the vertex shader, the screen-space distance from the vertex projected to screen space to the center of the screen is computed. Then the center of the screen may be C and the projected vertex position may be P. The distance may be in a Euclidian space, or a Manhattan distance, as two examples. Then the distance is D and assuming that the maximum distance from the center to the edge of the screen is L, the vertex shader computes the shading rate R as follows:

| | |
|---|---|
| vec2 C = vec2(1024,768); | //assume screen is 2048x1536 |
| float D = sqrt(dot(P-C,P-C)); | //compute Euclidean distance from projected vertex pos to C |
| t=1.0−D/L; | //a number between 0.0 (at edges) and 1.0 (center) |
| R=t*$R_{max}$+(1−t)*$R_{min}$; | //compute shading rate, R | where $R_{max}$ is the maximum shading rate that is desired in the center of the screen and $R_{min}$ is the minimum shading rate towards the edges of the screen. This can also be extended so that the shading rate R is clamped to a minimum or maximum shading rate. The programmable shading rate can be steered using other facts as well, including object importance, surface detail, object focus, object velocity, saliency maps, surface brightness and contrast, and combinations thereof.

Figure 6:
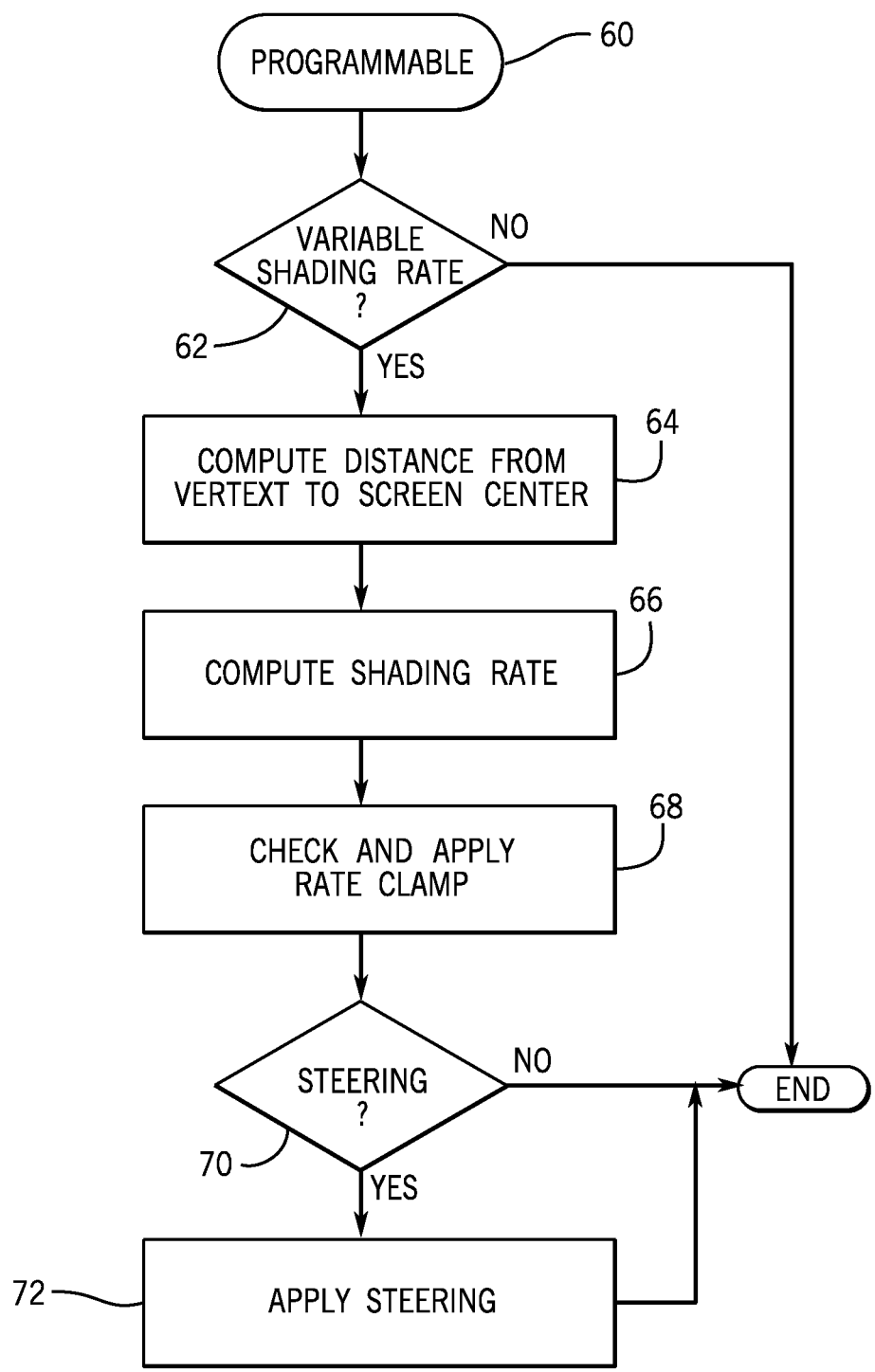
FIG. 6 is a flow chart for another embodiment.

A programmable shading rate sequence 60 shown in FIG. 6 may be implemented in software, firmware and/or hardware. In software and firmware embodiments it may be implemented by computer executed instructions stored in one or more non-transitory computer readable media such as magnetic, optical or semiconductor storages. For example, it may be stored in the shader core 38 shown in FIG. 4 in one embodiment.

The sequence 60 begins by determining if decoupled shading and particular, programmable variable shading rate, has been selected as determined in diamond 62. If so, the screen space distance from the vertex projected to the center of the screen is computed as indicated in block 64. Then the shading rate is computed as indicated in block 66. Any minimum or maximum clamping may be identified and applied in block 68.

Then in block 70 a check determines whether there is any steering such as steering based on object importance, surface detail, object focus, object velocity, saliency maps, surface brightness and/or contrast. If not, the flow ends and otherwise in block 72 the steering is applied or implemented.

In accordance with a third embodiment, particularly useful with devices having onboard cameras, a central processing unit or other processor tracks where the human eyes are looking on the screen and then feeds this coordinate data to a vertex shader. In one embodiment computer vision algorithms may be used.

Assuming that the computer vision algorithm computes that the viewer is looking at screen space pixel T, in the program above, C can be set equal to T, resulting in the highest shading rates being applied wherever the viewer is looking with the shading rate falling off with distance from T. In this case, one may control the value t for example by setting t=max (0.0, 1.0−D/L), because D may now be longer than L. Similarly an eye tracking-based shading rate may be used in conjunction fixed rate fall-off embodiment described previously.

Figure 7:
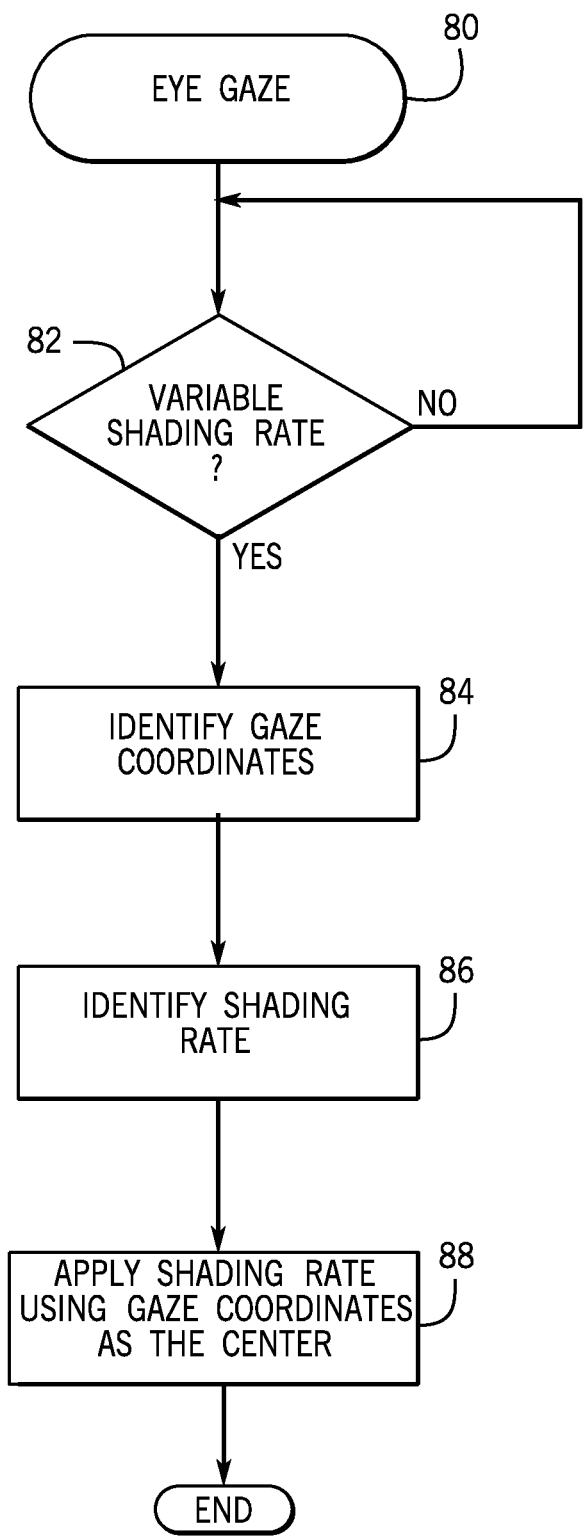
FIG. 7 is a flow chart for still another embodiment.

Referring to FIG. 7, an eye gaze sequence 80 may be implemented in software, firmware and/or hardware. In software and firmware embodiments it may be implemented by computer executed instructions stored in one or more non-transitory computer readable media such as magnetic, optical or semiconductor storages. In one embodiment it may be implemented in the shader core 38 shown in FIG. 4.

The eye gaze sequence 80, shown in FIG. 7, begins by determining (diamond 82) whether variable shading rate has been selected and particular, eye gaze based shading. If so, the gaze coordinates are identified as indicated in block 84. Then in block 86, the shading rate is identified, for example from a stored location or based on a default rate. Finally in block 88, the shading rate is applied using the gaze coordinates as the center.

In accordance with another embodiment, the shading rate may be lowered automatically when a sensor senses that the device is undergoing sufficiently fast movement or rotation. For example in a car game where the user rotates a steering wheel, when the steering wheel is rotated very quickly to avoid a collision, the shading rate may be reduced by using variable shading rate or other methods to save power when fast motion is depicted.

Similarly as another example, when a person is playing a game and riding in a car over a bumpy road, there may be so much shaking that the shading rate may be reduced to save power without creating a degradation that, under the circumstances, may be noticed by the user.

Figure 8:
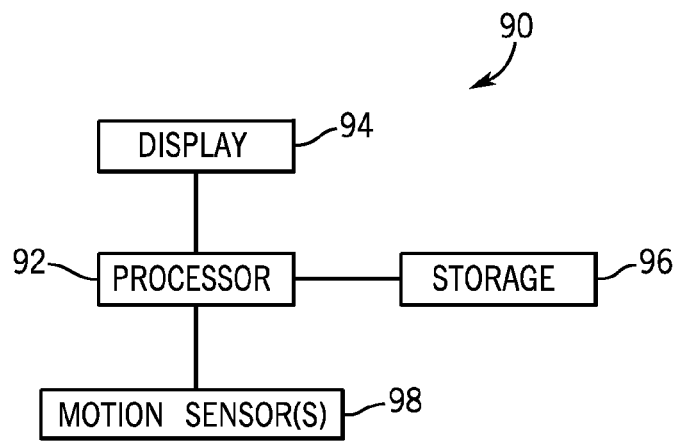
FIG. 8 is a schematic depiction of one embodiment.

Thus referring to FIG. 8, in one embodiment, a processor-based device 90 may be a mobile or stationary processor-based device. It may be, in some embodiments, a game device that includes user operable input devices such as joy sticks, steering wheels, and/or position sensors to mention some examples. Motion sensors 98 may be used to sense the speed of motion of a user input device such as a steering wheel, a joy stick or other input devices. Inputs from the motion sensors may be provided to the processor 92 which may be connected to a display 94 and storage 96.

The motion sensors 98 may be implemented in various ways including through the use of accelerometers. In some cases, some existing processor-based devices such as cellular phones already include such motion sensors.

In one embodiment, the shading rate may be reduced by a constant factor over the entire screen. This factor may increase proportionately or non-linearly to the speed of motion with a much lower shading rate with higher speed.

Another example is to assume that the rotation occurs around the center of a processor-based device and therefore a fall-off function may be applied from the center of the screen as described above. In such case the shading rate may, in one embodiment, be inversely proportional to the distance from the center of the screen to the tile being rendered and also inversely proportional to the rotation and speed of the device.

With a set of sensors, sensor fusion may be used to compute the approximate center of rotation of the device. High shading rates may be used at the center of the device and then the shading rate may be reduced based on distance from the center to the tile being rendered and to the rotational speed of the device. Thus the number of shading samples per pixel is reduced the higher the speed of the device and the further away from the center, the tile is located.

While, in some embodiments, variable shading rates are used, some embodiments may benefit even when variable shading rate is not used. If the sensor signals that the quality of rendering can be reduced, for example as described above when the rotation speed and distance from the rotation center to the tile being rendered is sufficient that image quality can be lowered, instead of using variable shading rate, the texture level of detail (LOD) may be changed automatically so that the texture lookups are done higher up, for example towards the top of the mid map pyramid. This increases the hits in the texture cache by lowering the filtered texture quality.

Another option is to reduce the resolution when the sensors signal that the device is undergoing a lot of motion. In such cases, resolution may be reduced by a factor k, in both the x and y directions. For example, assuming that the native resolution is 2048×1536, when sensors indicate that image quality can be reduced substantially, a driver may automatically reduce the resolution to 1024×768. This may be applied to all rendered targets in one embodiment. The final image can then be scaled up to the native resolution of 2048×1536 pixels.

Figure 9:
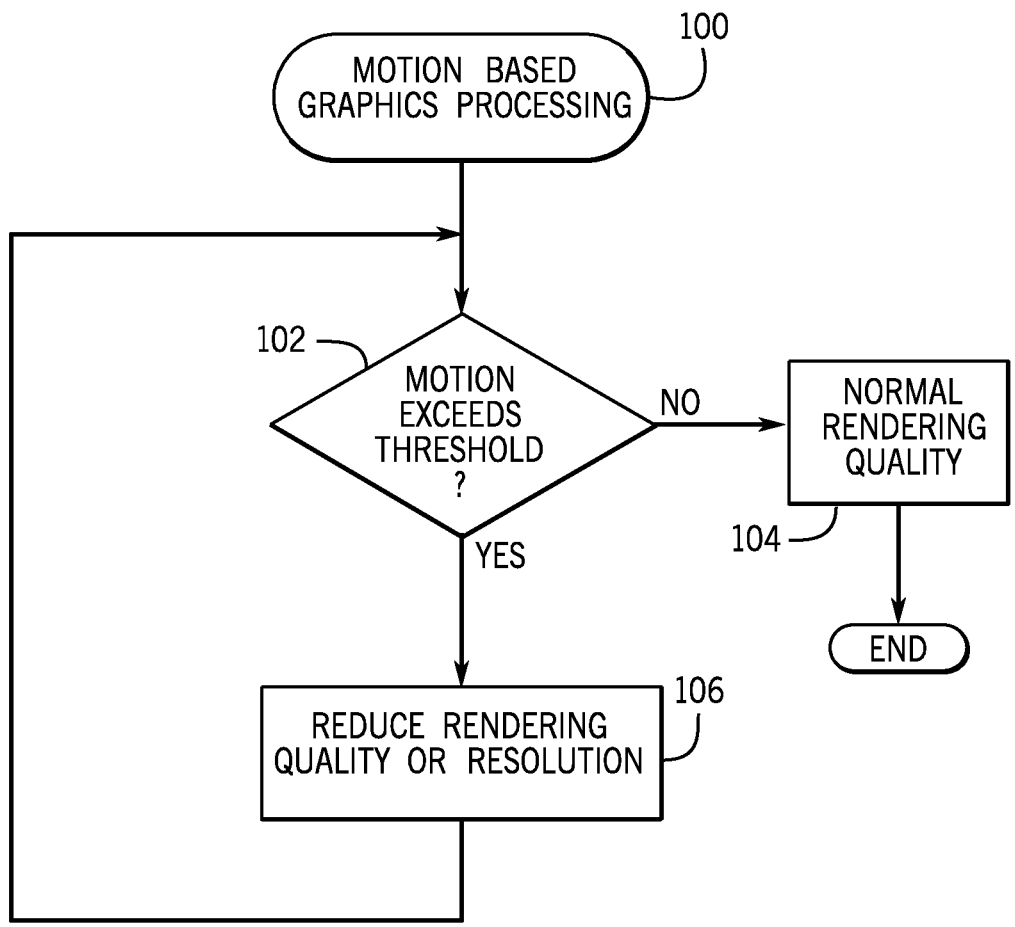
FIG. 9 is a flow chart for one embodiment.

Referring to FIG. 9, a sequence 100 for motion based graphics processing may be implemented in software, firmware and/or hardware. In software and firmware embodiments it may be implemented by computer executed instructions stored in one or more non-transitory storage media such as magnetic, optical or semiconductor storage. In some embodiments it may be implemented using the shader core 38 shown in FIG. 4.

The sequence 100, shown in FIG. 9, begins by checking whether detected motion exceeds a threshold as indicated in diamond 102. If so, the rendering quality may be reduced or the resolution may be reduced to give two examples as indicated in block 104. The net result may be to reduce power consumption during the period of high motion. When motion has reduced to a more normal level, then the resolution or rendering quality may be returned to normal as indicated in block 106.

Figure 10:
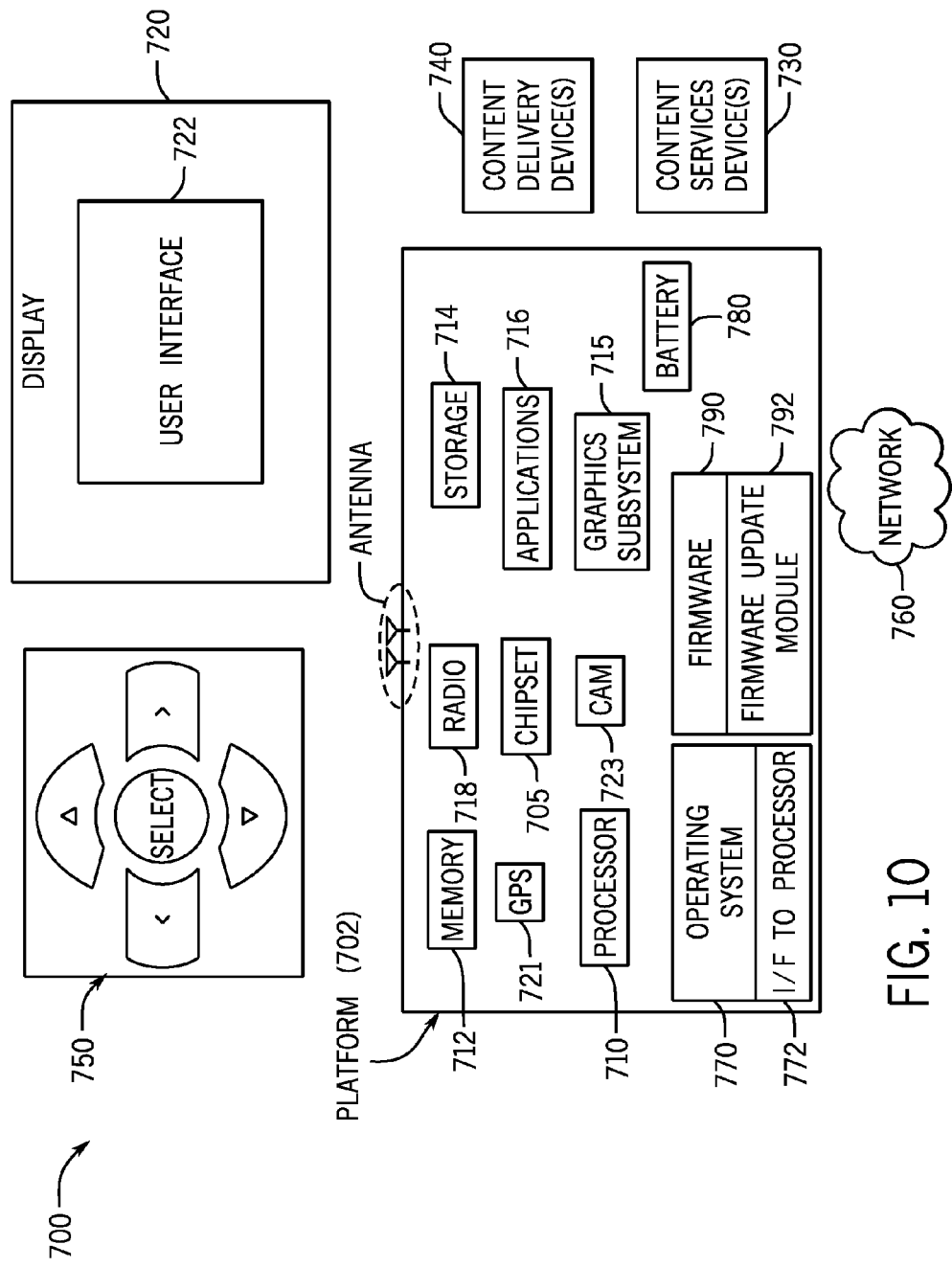
FIG. 10 is a system depiction for one embodiment.

FIG. 10 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile Internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 5 to 9, together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
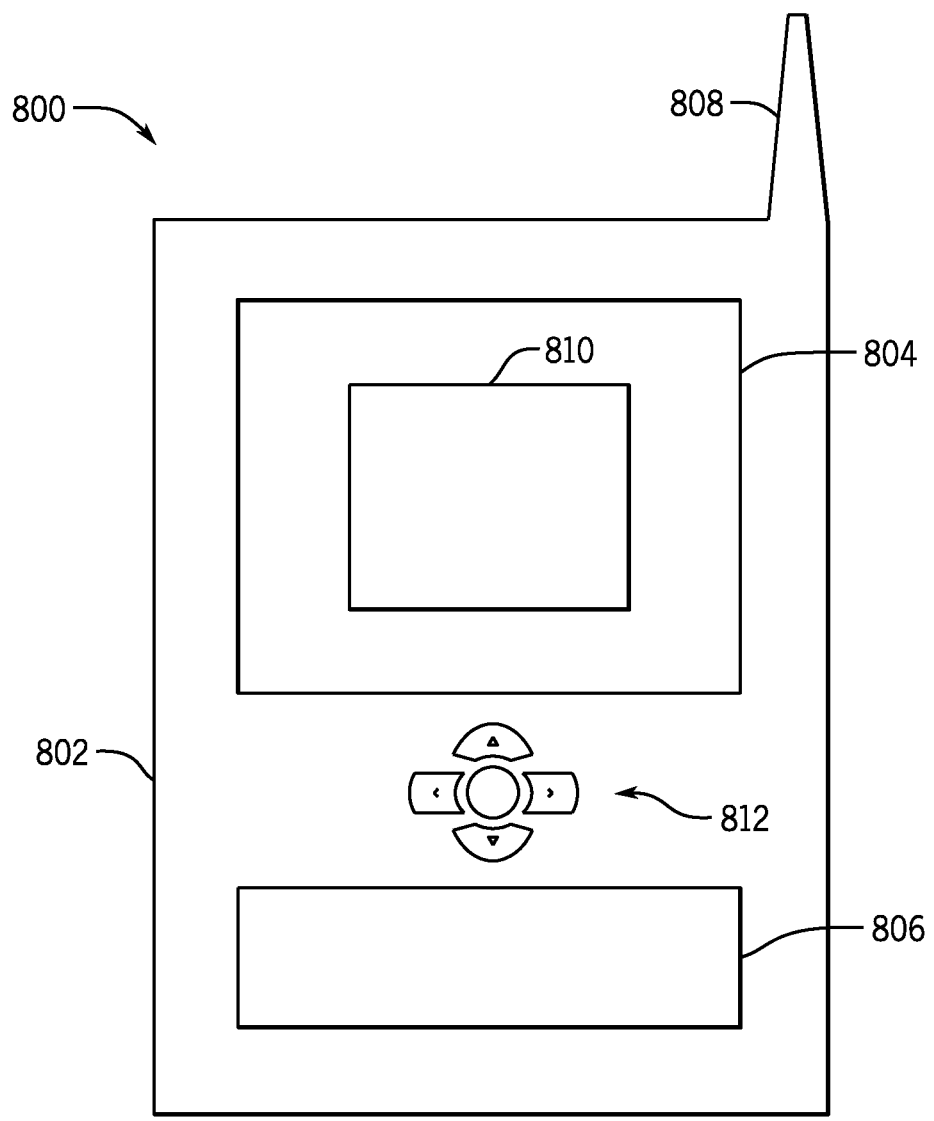
FIG. 11 is a front elevational view of the embodiment shown in FIG. 10.

As described above, system 700 may be embodied in varying physical styles or form factors. FIG. 11 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 5 to 9 in software and/or firmware embodiments.

As shown in FIG. 11, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising using a processor to alter the shading rate in one region of a picture or frame relative to another region, and applying an algorithm to determine the rate of change of shading rate across the picture or frame. The method may also include changing the shading rate relative to a center of the picture. The method may also include using a lookup table to determine how to change the shading rate. The method may also include programmably changing the shading rate. The method may also include clamping the extent of the rate of change of shading rate. The method may also include altering the shading rate based on what is depicted in the picture. The method may also include changing the shading rate based on at least one of object importance, surface detail, object focus, object velocity, saliency maps, surface brightness and contrast. The method may also include identifying said center using eye tracking. The method may also include using a motion sensor to decide whether to change at least one of shading rate or resolution of the picture. The method may also include using a motion sensor and a user input device.

In another example embodiment one or more non-transitory computer readable media storing instructions that, when executed, perform a method comprising using a processor to alter the shading rate in one region of a picture or frame relative to another region, and applying an algorithm to determine the rate of change of shading rate across the picture or frame. The media may include said method including changing the shading rate relative to a center of the picture. The media may include said method including using a lookup table to determine how to change the shading rate. The media may include said method including programmably changing the shading rate. The media may include said method including clamping the extent of the rate of change of shading rate. The media may include said method including altering the shading rate based on what is depicted in the picture. The media may include said method including changing the shading rate based on at least one of object importance, surface detail, object focus, object velocity, saliency maps, surface brightness and contrast. The media may include said method including identifying said center using eye tracking. The media may include said method including using a motion sensor to decide whether to change at least one of shading rate or resolution of the picture. The media may include said method including using a motion sensor and a user input device.

Another example embodiment may be an apparatus comprising a processor to alter the shading rate in one region of a picture or frame relative to another region and apply an algorithm to determine the rate of change of shading rate across the picture or frame, and a storage coupled to said processor. The apparatus may include said processor to change the shading rate relative to a center of the picture. The apparatus may include said processor to use a lookup table to determine how to change the shading rate. The apparatus may include said processor to programmably change the shading rate. The apparatus may include said processor to clamp the extent of the rate of change of shading rate. The apparatus may include said processor to alter the shading rate based on what is depicted in the picture. The apparatus may include said processor to change the shading rate based on at least one of object importance, surface detail, object focus, object velocity, saliency maps, surface brightness and contrast. The apparatus may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   identifying a center region of a picture or frame;
   using a processor to alter the shading rate at the center region of a picture or frame relative to a region surrounding the center region; and
   applying an algorithm to determine the shading rate at each of said regions.

2. The method of claim 1 including using a lookup table to determine how to change the shading rate.

3. The method of claim 1 including programmably changing the shading rate.

4. The method of claim 3 including clamping the extent of the rate of change of shading rate.

5. The method of claim 3 including altering the shading rate based on what is depicted in the picture.

6. The method of claim 5 including changing the shading rate based on at least one of object importance, surface detail, object focus, object velocity, saliency maps, surface brightness and contrast.

7. The method of claim 1 including identifying said center using eye tracking.

8. The method of claim 1, including using a motion sensor to decide whether to change at least one of shading rate or resolution of the picture.

9. The method of claim 8 including using a motion sensor and a user input device.

10. One or more non-transitory computer readable media storing instructions that, when executed, perform a method comprising:
- identifying a center region of a picture or frame;
- using a processor to alter the shading rate at the center region of a picture or frame relative to a region surrounding the center region; and
- applying an algorithm to determine the shading rate at each of said regions.

11. The media of claim 10, said method including using a lookup table to determine how to change the shading rate.

12. The media of claim 10, said method including programmably changing the shading rate.

13. The media of claim 12, said method including clamping the extent of the rate of change of shading rate.

14. The media of claim 12, said method including altering the shading rate based on what is depicted in the picture.

15. The media of claim 11, said method including identifying said center using eye tracking.

16. The media of claim 10, said method including using a motion sensor to decide whether to change at least one of shading rate or resolution of the picture.

17. The media of claim 16, said method including using a motion sensor and a user input device.

18. An apparatus comprising:
- a processor to identify a center region of a picture or frame, alter the shading rate at the center region of a picture or frame relative to a region surrounding the center region and apply an algorithm to determine the shading rate at each of said regions; and
- a storage coupled to said processor.

19. The apparatus of claim 18, said processor to use a lookup table to determine how to change the shading rate.

20. The apparatus of claim 18, said processor to programmably change the shading rate.

21. The apparatus of claim 20, said processor to clamp the extent of the rate of change of shading rate.

22. The apparatus of claim 20, said processor to alter the shading rate based on what is depicted in the picture.

23. A method comprising:
- using a processor to change the shading rate relative to a center of the picture; and
- applying an algorithm to determine the rate of change of shading rate across the picture or frame.

24. The method of claim 23 including identifying said center using eye tracking.

25. The method of claim 23 including using a motion sensor to decide whether to change at least one of shading rate or resolution of the picture.

26. One or more non-transitory computer readable media storing instructions that, when executed, perform a method comprising:
- using a processor to change the shading rate relative to a center of the picture; and
- applying an algorithm to determine the rate of change of shading rate across the picture or frame.

27. The media of claim 26, said method including identifying said center using eye tracking.

28. The media of claim 26, said method including using a motion sensor to decide whether to change at least one of shading rate or resolution of the picture.

29. An apparatus comprising:
- a processor to use a processor to change the shading rate relative to a center of the picture, apply an algorithm to determine the rate of change of shading rate across the picture or frame; and
- a memory coupled to said processor.

30. The apparatus of claim of claim 29, said processor to identify said center using eye tracking.

31. The apparatus of claim of claim 29, said processor to use a motion sensor to decide whether to change at least one of shading rate or resolution of the picture.

32. A method comprising:
- altering the shading rate or resolution at a center of a picture or frame relative to a region; and
- using a motion sensor to decide whether to change at least one of shading rate or resolution of the picture.

33. The method of claim 32 including using a motion sensor and a user input device.

34. One or more non-transitory computer readable media storing instructions that, when executed, perform a method comprising:
- altering the shading rate or resolution at a center of a picture or frame relative to a region; and
- using a motion sensor to decide whether to change at least one of shading rate or resolution of the picture.

35. The media of claim 34, said method including using a motion sensor and a user input device.

36. An apparatus comprising:
- a processor to alter the shading rate or resolution at a center of a picture or frame relative to a region, use a motion sensor to decide whether to change at least one of shading rate or resolution of the picture; and
- a memory coupled to said processor.

37. The apparatus of claim 36, said processor to use a motion sensor and a user input device.

* * * * *